United States Patent
Levinshtein et al.

(10) Patent No.: US 10,203,505 B2
(45) Date of Patent: Feb. 12, 2019

(54) FEATURE BALANCING

(71) Applicant: SEIKO EPSON CORPORATION, Tokyo (JP)

(72) Inventors: Alex Levinshtein, Vaughan (CA); Mikhail Brusnitsyn, Toronto (CA); Andrei Mark Rotenstein, Vaughan (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/815,113

(22) Filed: Nov. 16, 2017

(65) Prior Publication Data
US 2018/0136470 A1 May 17, 2018

Related U.S. Application Data

(60) Provisional application No. 62/422,992, filed on Nov. 16, 2016.

(51) Int. Cl.
| | | |
|---|---|---|
| *G02B 27/01* | (2006.01) | |
| *G06T 7/73* | (2017.01) | |
| *G06T 7/246* | (2017.01) | |
| *G06T 7/12* | (2017.01) | |
| *G06T 7/13* | (2017.01) | |

(52) U.S. Cl.
CPC .......... *G02B 27/0172* (2013.01); *G06T 7/246* (2017.01); *G06T 7/73* (2017.01); *G06T 7/12* (2017.01); *G06T 7/13* (2017.01)

(58) Field of Classification Search
CPC ....... G02B 27/0172; G06T 7/12; G06T 7/246; G06T 7/13; G06T 7/73
See application file for complete search history.

(56) References Cited

U.S. PATENT DOCUMENTS

| | | | | |
|---|---|---|---|---|
| 2010/0091096 | A1* | 4/2010 | Oikawa | G06F 3/011 348/53 |
| 2013/0300636 | A1* | 11/2013 | Cunningham | G10L 13/02 345/8 |
| 2015/0363979 | A1* | 12/2015 | Takano | A61B 6/461 345/633 |

OTHER PUBLICATIONS

Bradski, G., "The OpenCV Library", in Dr. Dobb's Journal of Software Technology, Nov. 1, 2000.
Harris, C. et al., "A Combined Corner and Edge Detector", in Proc. 4th Alvey Vision Conference, pp. 147-151, 1988.
Bay, H. et al., "Speeded-Up Robust Features (SURF)", Computer Vision and Image Understanding, vol. 110, No. 3, pp. 346-359, Dec. 15, 2007.
Lowe, D., "Distinctive Image Features from Scale-Invariant Keypoints", International Journal of Computer Vision, vol. 60(2), pp. 91-110. Jan. 22, 2004.

(Continued)

*Primary Examiner* — Muhammad N Edun
(74) *Attorney, Agent, or Firm* — Oliff PLC

(57) ABSTRACT

A head-mounted display includes a camera that obtains an image of an object within a field of view. The head-mounted display further includes a processor configured to determine a plurality of feature points from the image and calculate a feature strength for each of the plurality of feature points. The processor is further configured to divide the image into a plurality of cells and select feature points having the highest feature strength from each cell and which have not yet been selected. The processor being further configured to detect and track the object within the field of view using the selected feature points.

20 Claims, 9 Drawing Sheets

(56) References Cited

OTHER PUBLICATIONS

Calonder, M. et al., "BRIEF: Binary Robust Independent Elementary Features", in Proc. 11th European Conference and Computer Vision, Part IV, pp. 778-792, 2010.
Rosten, E. et al., "Faster and Better: A Machine Learning Approach to Corner Detection", In Proc. IEEE Trans. Pattern Analysis and Machine Intelligence, vol. 32, pp. 105-119, Jan. 2010.
Rosten, E et al., "Fusing Points and Lines for High Performance Tracking", In Proc. IEEE International Conference on Computer Vision, vol. 2, pp. 1508-1511, 2005.
Smith, S. et al., "SUSAN—A New Approach to Low Level Image Processing", in Proc. Int. Journal of Computer Vision, vol. 23(1), pp. 45-78, (1997).

\* cited by examiner

FEATURE BALANCING

CROSS-REFERENCE TO RELATED APPLICATIONS

This application claims the benefit of U.S. Provisional Application No. 62/422,992, filed on Nov. 16, 2016, the entire disclosure of which is hereby incorporated by reference in its entirety.

BACKGROUND

1. Technical Field

The disclosure relates generally to the field of computer vision, and more specifically to the field of detecting features in images.

2. Related Art

Computer vision is technology that enables computers to obtain useful information from videos or images. Computer vision has useful applications in many fields, including augmented reality (AR), drone technology, surveillance, security authentication, and many others.

In many such applications, it is important for the computer to be able to identify, locate, and track objects within image frames. One way to do this is to establish sparse point correspondences between features on a 3D model and features in the image and solve the Perspective-n-Point (PnP) problem. These correspondences are typically established by detecting stable keypoints and matching them using distinctive appearance-based descriptors, such as Oriented FAST (using the Features from Accelerated Segment Test algorithm) and Rotated BRIEF (ORB) descriptors.

Keypoints generally are areas (patches of pixels) of unusual contrast or that are otherwise distinctive. Once keypoints for an object are known by the computer, the computer can identify that object in an image by locating these keypoints. However, in order to do this, keypoints for the object of interest should first be collected (usually from another image of the object).

SUMMARY

A problem arises when the object of interest is not well lit in the source image, or due to photographic conditions, the source image does not provide a lot of useable keypoints on the object. Usually, objects of interest are located in the foreground and in the center of the image used to gather keypoints. As a result, the objects can have very different lighting and other photographic conditions than the background. For example, if the background has brighter lighting than the object of interest, a conventional keypoint gathering algorithm will gather a disproportionately large number of keypoints from the background compared to the object. This can result in the computer selecting more keypoints from the background, and insufficient keypoints on the object of interest.

The problem described above arises from algorithms that select the best keypoints from a given image, and exclude the others. The best keypoints are keypoints that score the highest on a rating algorithm, and e.g. have more extreme or unusual contrast patterns than other points or regions in the image. It should be noted that the score of each feature point may be referred to herein as the "feature strength" of the feature point.

To solve the aforementioned problem, one approach is to break the image into regions, and select equal numbers of keypoints from each region. This results in a relatively even distribution of keypoints from all areas of the source image. However, this can result in a disadvantageous situation where good keypoints are excluded and poor keypoints are selected. Poor keypoints will be less likely to be detected by a computer attempting to recognize or track the object when the computer vision software is later used. Moreover, the separate analysis of regions to collect keypoints can result in keypoints either being omitted or double-counted due to the boundaries between the regions. Thus, performance of the computer vision application is reduced when an algorithm selecting keypoints equally from all regions in an image is used.

These problems can be overcome by using a balanced algorithm in which the computer selects keypoints based on both location diversity and quality. Such algorithms and methods can provide additional advantages where keypoints are obtained (or object recognition is performed) in outdoor environments where bright lighting and high contrast are present. Thus, the methods herein could be applied to robotics, unmanned aerial vehicles, and self-driving cars. Such advantages can be realized by the following exemplary embodiments.

One such embodiment is a head-mounted display, including a camera that obtains an image of an object within a field of view. The head-mounted display further includes a processor configured to determine a plurality of feature points from the image and calculate a feature strength for each of the plurality of feature points. The processor is further configured to divide the image into a plurality of cells and identify a number of cells containing non-selected feature points which are feature points that have not yet been selected. The processor is further configured to determine a number of feature points to be selected for each of the number of cells containing non-selected feature points, the number of feature points to be selected being based on the number of cells containing the non-selected feature points. The processor is further configured to select, up to the number of feature points to be selected, feature points having the highest feature strength from each cell and which have not yet been selected, thereby identifying the feature points as selected feature points instead of non-selected feature points. The processor is further configured to repeat the determination of the number of feature points through the identification. The processor is further configured to detect and track the object within the field of view using the selected feature points. The head-mounted display further includes a display that allows simultaneous viewing of an external scene and a virtual image, and when the object is within the field of view, the display is configured to display a virtual image in a consistent positional relationship to the object using object location information derived from tracking the object.

In some embodiments, the number of feature points to be selected is inversely proportional to the number of cells containing non-selected feature points, and the number of feature points to be selected is a quota divided by the number of cells containing non-selected feature points. In some embodiments, the determination of the number of feature points to be selected to the updating of the number of cells are repeated until a number of selected feature points is equal to a quota. In some embodiments, the processor is further configured to: compare the number of cells containing non-selected feature points to a quota before using the feature points; and repeat the determination of the number of feature points to be selected to the updating of the number of cells only when the quota is less than or equal to the number of cells containing non-selected feature points. In some embodiments, the processor is further configured to: when the quota is greater the number of cells containing non-selected feature points, determine if a number of feature points in the selected groups is equal to the quota, prior to using the feature points; and when the number of feature points in the selected groups is less than the quota: sort non-selected feature points by their feature strength; and select a number of non-selected feature points equal to a difference between the quota and the number of feature points in the selected groups. In some embodiments, for each cell, the number of selected feature points is equal to the number of feature points to be selected when a number of feature points in the cell is greater than or equal to the number of feature points to be selected, and the size of the group is equal to the total number of feature points in the cell when the total number of feature points in the cell is less than the number of feature points to be selected. In some embodiments, detecting the object includes: obtaining a second image of the object in the external scene using the camera or another camera; locating feature points in the selected groups within the image; and generating location information of the object within the external scene based on the obtained locations of the feature points. In some embodiments, the number of feature points to be selected is selected based on an optimization equation.

One such embodiment is a non-transitory storage medium containing program instructions that when executed by a processor, cause the processor to: obtain an image of an object; determine a plurality of feature points from the image and calculate a feature strength for each of the plurality of feature points; divide the image into a plurality of cells and identify a number of cells that contain non-selected feature points which are feature points that have not yet been selected; determine a number of feature points to be selected for each of a number of cells containing non-selected feature points, wherein the number of feature points to be selected is based on the number of cells containing the non-selected feature points; select, up to the number of feature points to be selected, feature points having the highest feature strength from each cell and which have not yet been selected, thereby identifying the feature points as selected feature points instead of non-selected feature points; repeat the determining through the identifying; and detect the object within a scene using the selected feature points.

One such embodiment is a method of detecting an object in a scene using a computer. The method includes obtaining an image of an object, using a camera. The method further includes determining a plurality of feature points from the image and calculating a feature strength for each of the plurality of feature points, using a processor. The method further includes dividing the image into a plurality of cells and identifying a number of cells that contain non-selected feature points which are feature points that have not yet been selected, using the processor. The method further includes determining a number of feature points to be selected for each of a number of cells containing non-selected feature points, wherein the number of feature points to be selected is based on the number of cells containing the non-selected feature points, using the processor. The method further includes selecting, up to the number of feature points to be selected, feature points having the highest feature strength from each cell and which have not yet been selected, thereby identifying the feature points as selected feature points instead of non-selected feature points, using the processor. The method further includes repeating the identifying through the determining. The method further includes detecting the object within the scene using the selected feature points, using the processor.

In some embodiments, the number of feature points to be selected is inversely proportional to the number of cells containing non-selected feature points. In some embodiments, the number of feature points to be selected is a quota divided by the number of cells containing non-selected feature points. In some embodiments, the determination through the identification are repeated until a number of selected feature points is equal to a quota. In some embodiments, the method further includes: comparing the number of cells containing non-selected feature points to a quota, using the processor; and repeating the determination to the identification only when the quota is less than or equal to the number of cells containing non-selected feature points. In some embodiments, the method further includes: when the quota is greater the number of cells containing non-selected feature points, determining if a number of feature points in the selected groups is equal to the quota, using the processor; and when the number of feature points in the selected groups is less than the quota: sorting non-selected feature points by their feature strength, using the processor; and selecting a number of non-selected feature points equal to a difference between the quota and the number of selected feature points, using the processor. In some embodiments, the method further includes: tracking the object using the feature points in the selected groups, using the processor; and displaying a virtual image in a consistent positional relationship to an image of the object using derived object location information. In some embodiments, for each cell, the size of the group is equal to the number of feature points to be selected when a number of feature points in the cell is greater than or equal to the number of feature points to be selected, and the size of the group is equal to the number of feature points in the cell when the number of feature points in the cell is less than the number of feature points to be selected. In some embodiments, detecting the object includes: obtaining a second image of the object in the scene using the camera or another camera; locating feature points in the selected groups within the image; and generating location information of the object within the scene based on locations of the obtained feature points.

DETAILED DESCRIPTION OF EMBODIMENTS

Figure 1:
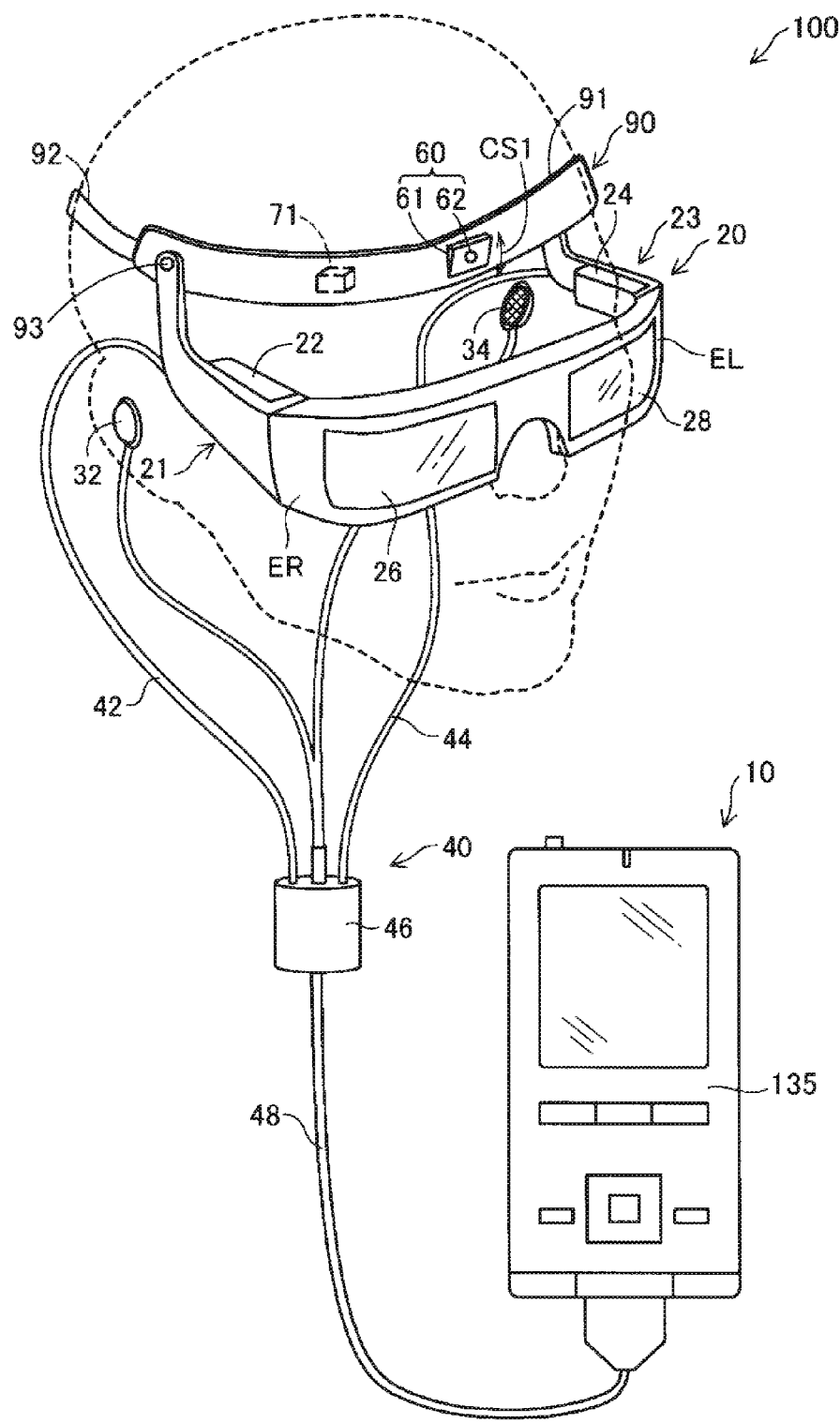
FIG. 1 is a diagram illustrating a schematic configuration of an example HMD.

FIG. 1 shows a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
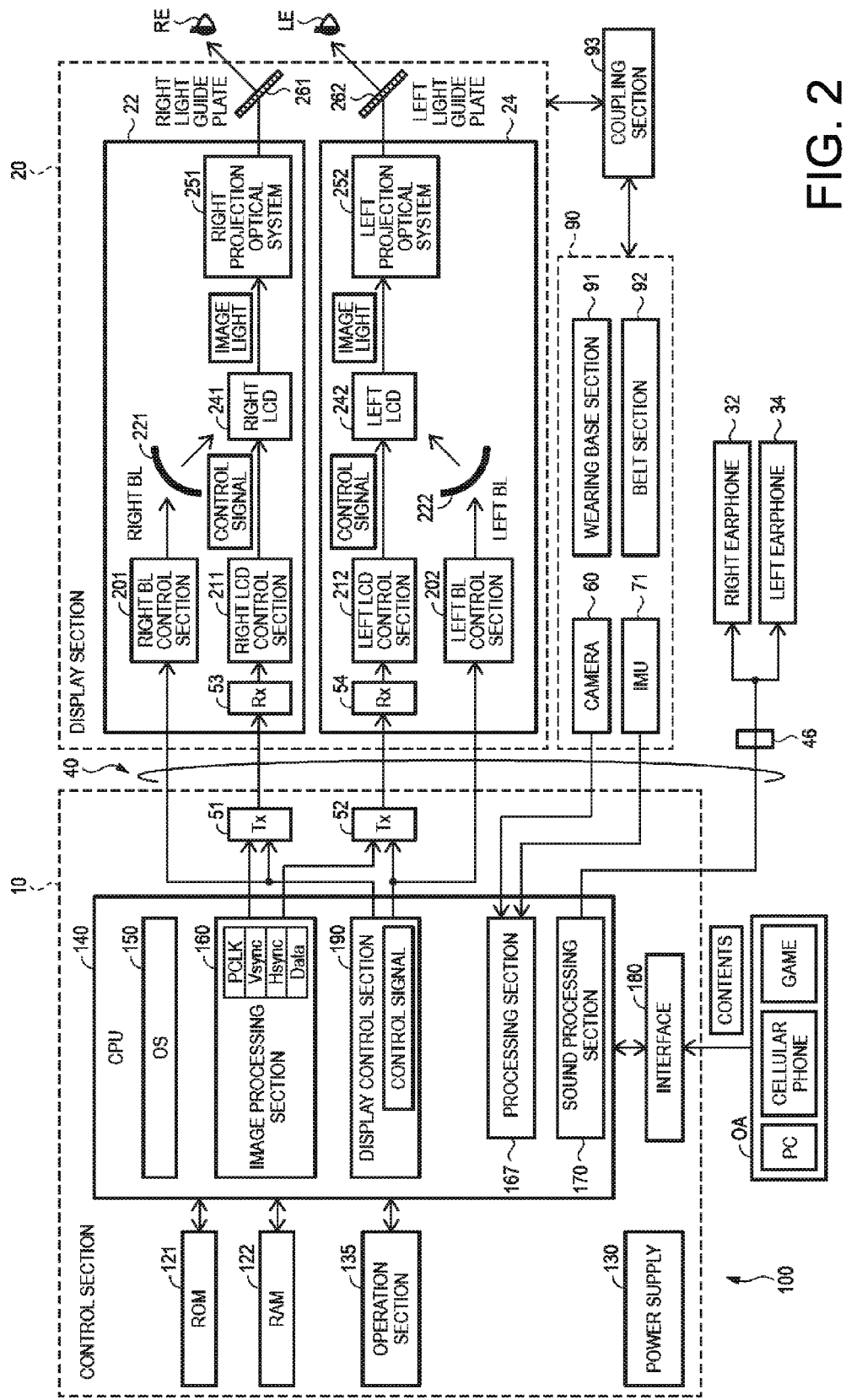
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (also referred to herein as processor 140), an interface 180, and a transmitter 51 (Tx 51) and a transmitter 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs and/or may be specifically programmed for the methods disclosed herein, such as realizing tracking processing and AR display processing explained below.

The CPU 140 develops, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driver 22 and the left display driver 24. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing section 160 acquires an image signal included in contents and transmits the acquired image signal to receivers 53 and 54 of the display section 20 via the transmitters 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a nomography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

Figure 3:
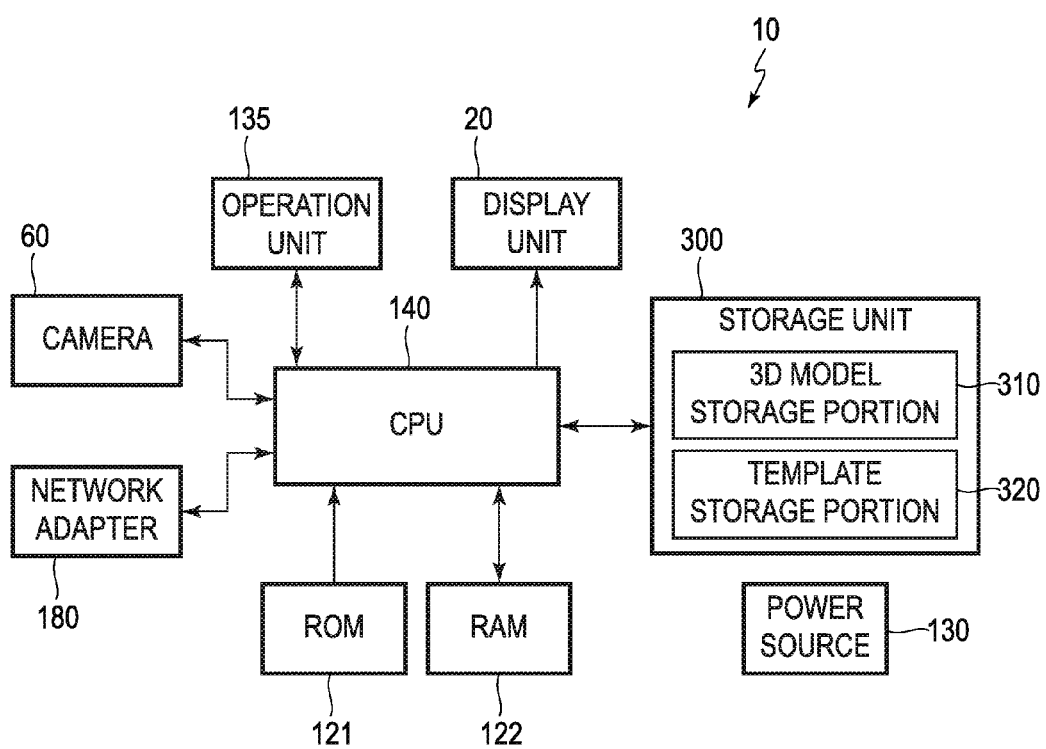
FIG. 3 is a system according to one embodiment.

FIG. 3 is a block diagram illustrating one embodiment of a functional configuration of a controller 10 as an information processing device in the present embodiment which performs the methods described above. The controller 10 (e.g. a computer) includes a CPU 140, a display unit (display section) 20, a power source (power supply) 130, an operation unit (operation section) 135, a storage unit (storage medium) 300, a ROM 121, a RAM 122, a camera 60 and a network adaptor (interface) 180. The CPU 140 reads various programs from the ROM and develops the programs in the RAM, so as to execute the various programs. The power source 130 supplies power to each unit of the computer 10. As the power source 130, for example, a secondary battery may be used. The operation unit 135 is a user interface (UI) for receiving an operation from a user. In one embodiment, the operation unit 135 includes a keyboard, a mouse and a touch pad and the like and their driver software.

The storage unit 300 stores various items of data and computer programs (i.e. program instructions), and includes a hard disk drive, a solid-state drive, or the like. The storage unit 300 includes a 3D model storage portion 310 and a template storage portion 320. The 3D model storage portion 310 stores a three-dimensional model of a target object, created by using computer-aided design (CAD). The template storage portion 320 stores a template created by a template creator (not shown). The camera 60 is an RGB image sensor and used when the CPU 140 acquires an image or a video sequence of a real object. The network adaptor 180 is configured to allow CPU 140 to communicate with another computer such as a server computer via a wireless network, so that, for example, the computer 10 receives from the other computer a program that causes the computer 10 (or CPU 140) to perform functions described herein.

Figure 4:
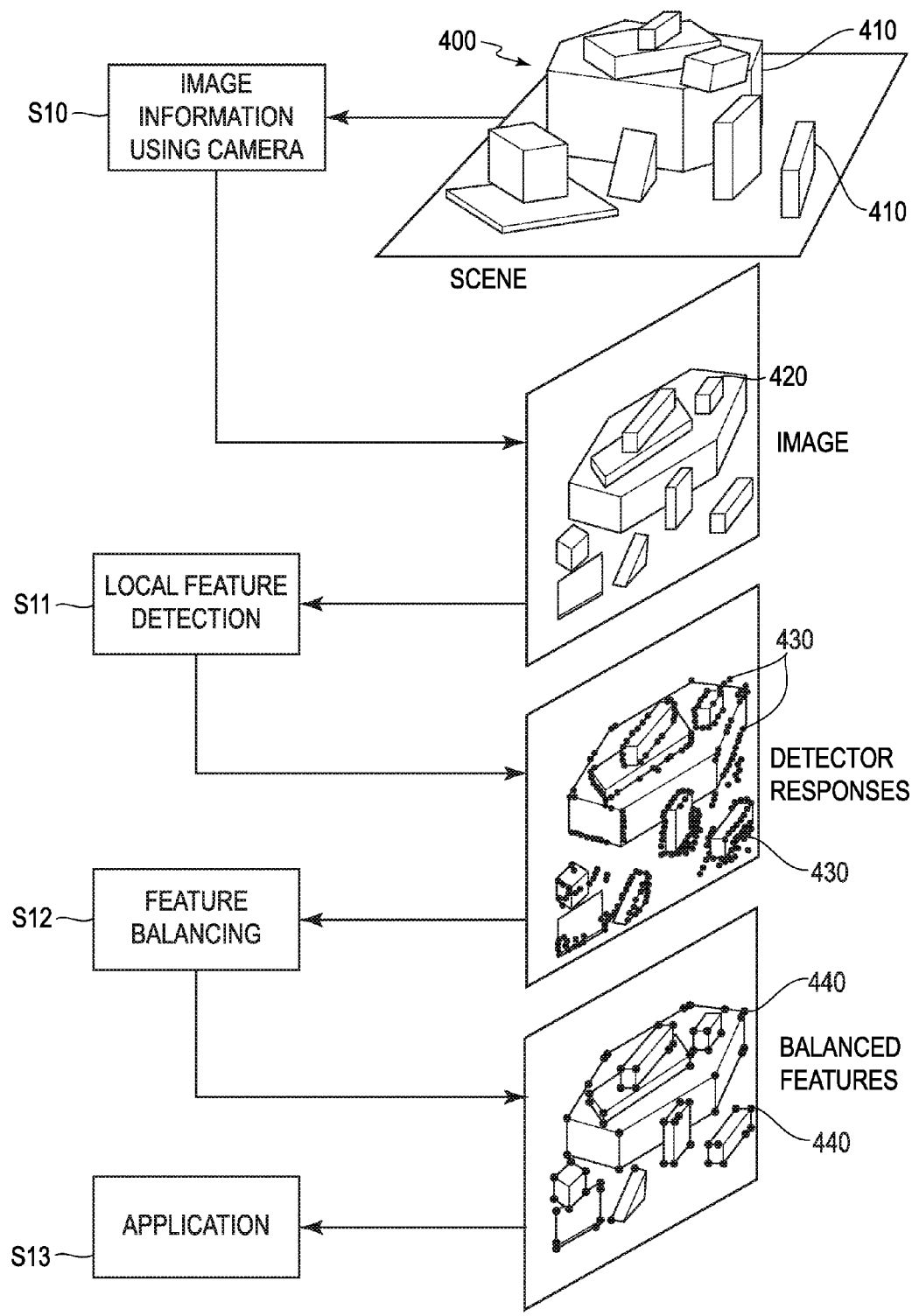
FIG. 4 is a flowchart of a method of obtaining keypoints according to one embodiment.

According to the embodiment shown in FIG. 4, keypoints are collected from an imaged scene. This is a method of obtaining candidate keypoints according to an embodiment. Scene 400 contains objects 410. An objective of the keypoint obtaining method shown in FIG. 4 is to obtain keypoints on objects 410 from an image 420 of scene 400. Imaging of the scene is performed in step S10. Once the image is obtained, feature detection is performed in step S11. In feature detection, the computer analyzes the image for regions of high contrast or other unusual characteristics and selects several candidate keypoints (candidate feature points) 430.

Performance of these systems depends in part on the strength of the responses of feature detection and on how the responses are distributed throughout the image. In particular, strong responses are usually desired from the foreground—the portion of the image containing information normally relevant to the given task. For example, systems that perform object detection, pose estimation or tracking tasks rely on local features and often perform best when the strongest feature detector responses are from the portion of the image containing the object.

One problem currently exists that, in many real-world operating conditions, the physical image formation process often produces images where the foreground has few or no strong features; these responses end up being suppressed by these methods, which results in poor performance. This is complicated by the fact that performance also depends on the number of features N that are kept (N herein refers to the quota). A small quota N typically results in poor accuracy, because the number of keypoints being used for object identification and tracking are low. However, too large a quota N slows execution time, because computer resources are needed to analyze the larger number of keypoints. This can be a problem for real-time applications. For this reason, N is often optimized for performance (e.g. using an optimization equation), but that may result in too many useful features having moderate strength being suppressed.

A solution is to partition an input image into a grid of M cells, perform feature detection inside each cell (partition) independently, and typically retain not more than the $$\left\lfloor \frac{N}{M} \right\rfloor$$

strongest responses from each cell. A public domain implementation of this method exists in the free open-source library OpenCV (as of version 2.4.x) (see [Bradski, 2000] and opencv.org). However, the solution is incomplete in at least two ways:

First, interest points on grid cell boundaries are missed by the previous solution. Indeed, many feature detection methods depend on 2D discrete convolutions involving K×K size convolution kernels. Such methods cannot provide accurate responses for image boundaries of up to size $$\left\lfloor \frac{K}{2} \right\rfloor$$

pixels. Since this method treats each cell independently, features are not detected on K-pixel-wide boundaries between cells in addition to the image border. The greater the number M of grid cells are used, the more uniformly-distributed the responses tend to be, but the more likely it is that features are missed. In tracking applications, for example, a feature moving over time will suddenly "disappear" once they reach a cell boundary; this significantly degrades tracking performance. Attempts to overcome this by supporting convolutions on image boundaries, such as by "mirroring" pixels, introduce inaccuracies and false detections, which affect overall performance.

Second, fewer features are retained than desired in the previous solution. In embodiments where $$\left\lfloor \frac{N}{M} \right\rfloor$$

responses per cell are retained, for choices of N that are not a multiple of M, retaining equal numbers of features per cell results in fewer responses being used than is available from the quota; that is, there are $$N - M \left\lfloor \frac{N}{M} \right\rfloor$$

features that could have been kept but were suppressed. In other words, the number of desired points is rounded down in a case where N is not a multiple of M, and the remainder points would normally not be used.

Thus, a better method of selecting keypoints 440 is needed, and described herein. Such methods are shown in FIG. 4, starting at step S12, where keypoint selection is performed. In keypoint selection, the computer uses an algorithm which factors location diversity and quality to select a group of keypoints that will be saved and used for computer vision applications. The keypoint selection methods herein (also referred to as "feature balancing") accept local features as input and retain the stronger features.

The method of selecting keypoints according to embodiments herein solves the problem of retaining the quota N strongest local feature detection responses in an image partitioned into a grid of M cells. Unlike the previous methods, the present methods perform feature detection at least once on the entire image and then choose the strongest $$\left\lfloor \frac{N}{M} \right\rfloor$$

features, typically, per cell. If fewer than $$\left\lfloor \frac{N}{M} \right\rfloor$$

features are available in a given cell, the remainder of the quota is selected from cells having additional features available for retention, so that the number of features selected in some cells may be greater than $$\left\lfloor \frac{N}{M} \right\rfloor$$

but where the total number retained does not exceed the quota N. The present method overcomes the prior art disadvantages of missing local features on the boundaries in between cells (but not on image boundaries). The present method also retains the $$N - M \left\lfloor \frac{N}{M} \right\rfloor$$

features that could have been kept but are suppressed in the prior art, so that the entire quota is used up. That is, if fewer features are returned than the quota number N, the remainder of the quota is chosen from the strongest responses across the entire image instead of from each cell. The present method enables keypoint collection where the number of responses is balanced throughout the image.

Another advantage is improvement of locational diversity of keypoints throughout the image. With prior methods of keypoint selection, feature detector responses are situated densely around image regions having high contrast, and very few responses are situated where there is low contrast. With the present method, more responses are situated in the low contrast regions of the image.

In some embodiments, FAST corners are used as the local feature detector, and the score function is the Harris score. The Harris Corner Detector is a corner detection operator that is commonly used in computer vision algorithms to extract corners and infer features of an image. The feature strength associated with points using this detector is the Harris score. In such embodiments for object detection, FAST corners are detected first, and then the Harris score for each corner (feature point) is calculated. A process according to the present embodiment is indicated as a pseudo-code below. In the pseudo-code, "Cell$_{ij}$", "Q" and "Output" are variables denoting sets, "U" and are union operators, and the bracket "[ ]" represents a floor function.

ALGORITHM DetectCornersUsingFeatureBalancing( )

INPUTS: image Image, grid Rows, grid Cols, number of features to detect N.

Features' ← DetectFeatures (Image, Multiplier * N)
Features ← CalculateHarrisScores (I, Features')
Initialize Rows × Cols sets Cell$_{ij}$, 0 <= i < Rows, 0 <= j <=
Cols. Each Cell$_{ij}$ = ∅
For each feature in Features:
Calculate which cell index i, j contains the co-ordinate of Feature (r, c).

$$i = \left\lfloor r \frac{\text{Rows}}{\text{Image.height}} \right\rfloor, j = \left\lfloor c \frac{\text{Cols}}{\text{Image.width}} \right\rfloor$$

Cell$_{ij}$ ← Cell$_{ij}$ ∪ {Feature}
Output ← ∅
Loop
Count the number P of sets Cell$_{ij}$ that are nonempty.
For each cell Cell$_{ij}$ do -continued Select a subset Q of size up to $\left\lfloor \frac{N}{P} \right\rfloor$ from Cell$_{ij}$ having the
highest Harris Scores.
Cell$_{ij}$ ← Cell$_{ij}$/Q (remove Q from Cell$_{ij}$)
Output ← Output ∪ Q
N ← N − |Q| (size of Q)
Until 0 ≤ N ≤ P
Construct Q ← ∪$_{ij}$Cell$_{ij}$.
Sort Q by Harris Score and keep the N best features.
Return Output ∪ Q.

Note
that Rows × Cols = the number of grid cells M.

The function DetectFeatures(I, n) is a corner detector that returns the n strongest FAST corners in image I. The function K'←CalculateHarrisScores(I, K) accepts a set of features K in image K and return a new set of features K' consisting of the features in K, where each feature in K is augmented with its Harris Corner Score in image I. The scalar Multiplier is chosen to encourage the availability of features in each cell. In one embodiment, Multiplier is set to 5.

Figure 5A:
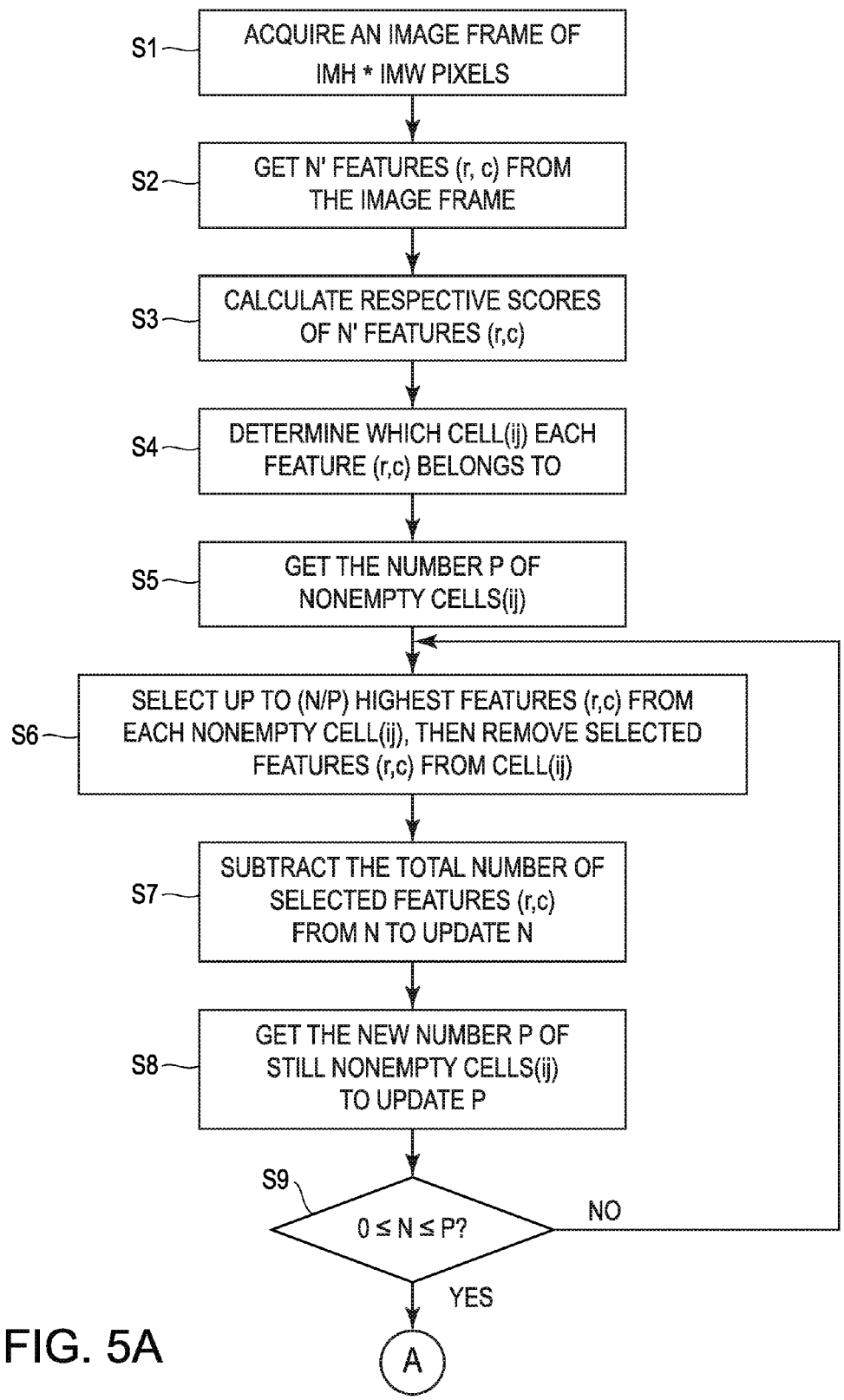
FIGS. 5A and 5B are a flowchart of a method of selecting keypoints according to one embodiment.
Figure 5B:
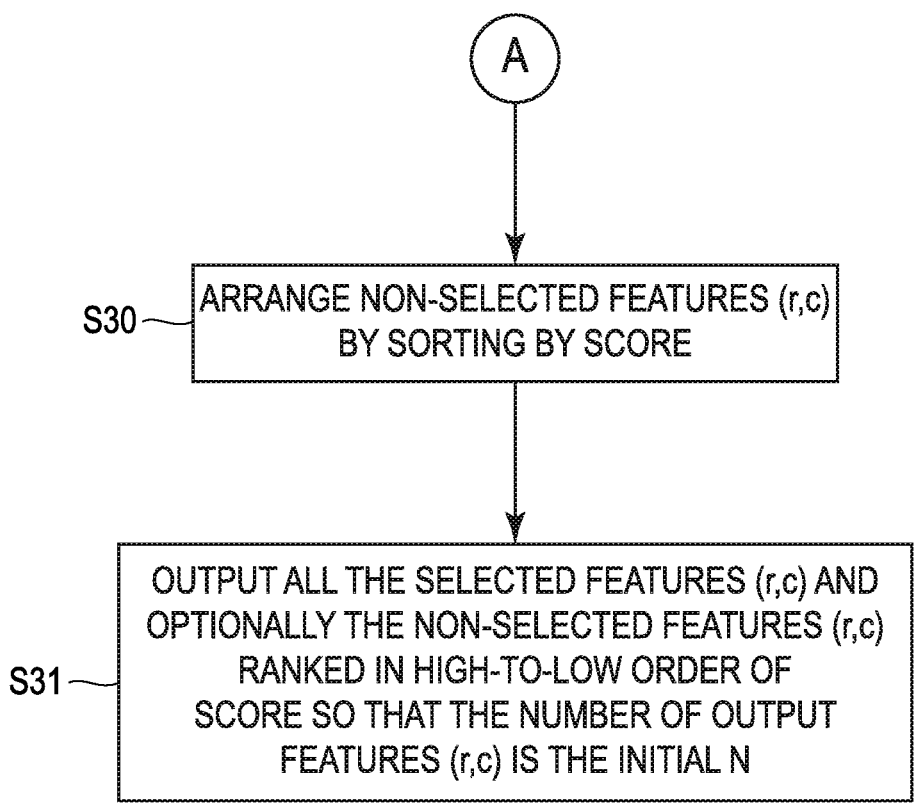

FIGS. 5A and 5B show a flowchart according to the present embodiment. At step S1, a CPU 140 (also referred to herein as "processor") in a computer (or other computer vision device) acquires an image frame of IMH*IMW pixels from an image/video stream in which the camera captures. Note, "IMH" and "IMW" are the height (in pixels) and the width (in pixels) of the image, respectively, and correspond to "image.height" and "image.width" in the pseudo-code above, respectively.

At step S2, the CPU 140 derives N' features (r,c) from the image frame, where N' is a multiplier times N (Multiplier*N), and (r,c) refers to a pixel position of the feature element in the image and satisfies (0,0)≤(r,c)≤(IMH−1,IMW−1). N' refers to the total number of feature points that are detected by the processor, which is typically larger than the quota N, which is the number of desired feature points. N' is 500 if the multiplier and N are 100, and 500, respectively, for example.

At step S3, Harris Scores of respective N' features (r,c) are calculated.

At step S4, the CPU 140 determines which cell(ij) each feature (r,c) belongs to, by e.g. locating the coordinates of the points within the image frame. Note that the image frame consists of a grid of M cell(ij)s, where M is the multiplication of the number of rows times columns in the divided grid (e.g., M=ROWS*COLS). The size of each cell(ij) is a*b pixels, where a=IMH/ROWS and b=IMW/COLS. The suffix (ij) refers to a position of the cell within the grid (i identifying the column and j identifying the row).

At step S5, the CPU 140 obtains "P" that represents the number of nonempty cells(ij). "Nonempty cell(ij)" means at least one feature (r,c) remains in that particular cell (and thus is not empty of features). In other words, CPU 140 uses the location of each of the feature points, and counts the number of feature points in each cell. Each cell where the number is nonzero is added to the count of nonempty cells.

At step S6, the processor selects up to [N/P] of the highest score features (r,c) at from each nonempty cell(ij), then removes the selected features (r,c) from the corresponding cell(ij). Note, the bracket "[ ]" represents a floor function. In mathematics and computer science, a floor function is the function that takes as input a real number x and gives as output the greatest integer that is less than or equal to x. Because N/P is not always an integer, the method of FIGS.

5A and 5B rounds down N/P to an integer value for the number of points to be selected.

At step S7, the total number of selected features (r,c) is subtracted from N (the quota) and the resultant number is set as the new N.

At step S8, the number of nonempty cells(ij) that still have features in them after step S7 (i.e., the nonempty cells (ij) that are still nonempty) is counted and the resultant number is set as the new number of nonempty cells P. This may be accomplished by the system reviewing all non-selected features in the cells and determining how many of these cells (ij) have features which have not been previously selected. The P is then updated in the system and computations then proceed with this updated P.

At step S9, the CPU 140 of the system determines whether the condition 0≤N≤P is satisfied or not using the updated N and P values calculated in steps S7 and S8. When the condition is not satisfied (i.e., No at step S9), the process may return to step S6, where steps S6 through S8 are repeated.

When the condition of S9 is satisfied (i.e., Yes at step S9), the processor arranges or ranks the non-selected or non-selected features (r,c) by sorting in order of score at step S30. These non-selected features are left over because of the rounding down that occurs at step S6.

At step S31, all the selected features (r,c) and, optionally, the non-selected features (r,c) arranged in high-to-low order of score are output so that the total number of the output features (r,c) is the same as the initial N. It should be noted that the terms "score" and "feature strength" may be used interchangeably herein and thus have the same meaning.

After all of the selected features (referred to herein as "keypoints" or "selected feature points") 440 have been selected from the repeated process of steps S6-S9, these keypoints are stored in local or remote non-transitory medium, such as, e.g., storage medium 300, ROM 121, or RAM 122.

Figure 6:
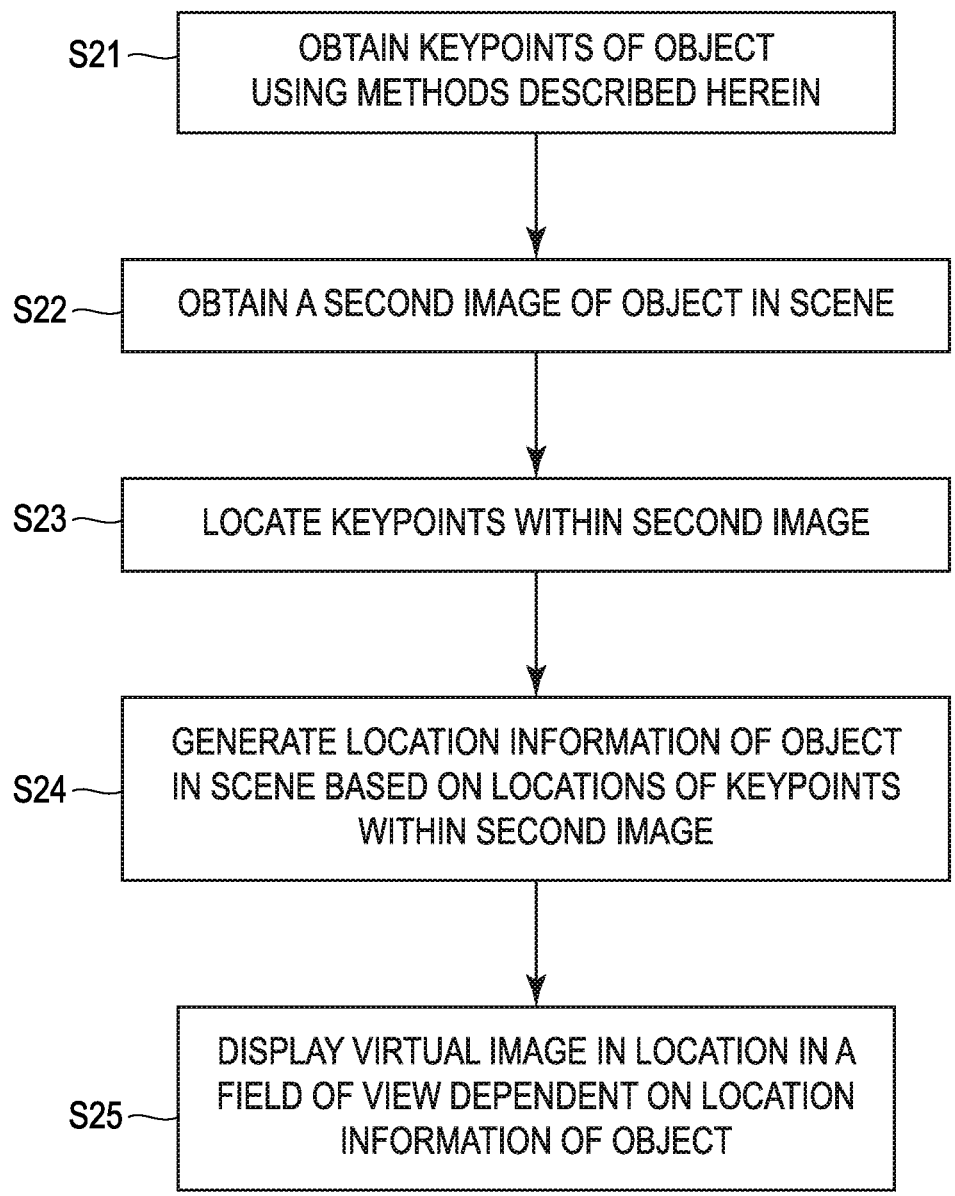
FIG. 6 is a flowchart of a method of object detection and tracking according to one embodiment.

In step S13 of FIG. 4, the keypoints 440 may be used for a computer vision application, such as object tracking in an augmented reality application. An exemplary method of using the keypoints 440 for object detection and tracking is shown in FIG. 6. This method can be implemented on an HMD, robot, mobile device, autonomous vehicle, or any device capable of computer vision. First, keypoints are obtained using the methods described herein in step S21. This is described above in FIGS. 4, 5A, and 5B.

Next, a second image of the object 410 (or a similar object) is obtained in a scene (usually a different scene than the scene used for obtaining keypoints 440) in step S22. This may be accomplished using the same hardware and method (e.g., step S1) which obtained the first image.

Then, in step S23, the second image is analyzed by CPU 140 to locate regions of pixels that match the keypoints 440 in order to match all of the selected features from the feature balancing process of FIGS. 5A-5B with corresponding features in the second image. This analysis can use an algorithm or method similar to the method of obtaining and selecting keypoints as discussed above for FIGS. 5A-5B.

Once the keypoints 440 are located in the second image, their location within the second image is used to determine a location and orientation of the object within the scene in S24. For example, relative locations of the keypoints 440 in the second image can be used to determine relative orientation of the object 410 and the camera that took the second image. In other words, the rotation of the points in the image frame can indicate a rotational relationship between the object and the camera. Similarly, a translation of the points can indicate a translational relationship. The distance between the points can indicate a distance between the camera and the object. Similarly, the location of the keypoints 440 within the second image can be used to determine the location of the object 410 relative to the camera that took the second image.

In S25, a virtual image is displayed on a location relative to the determined location (and possibly orientation) of the object 410. For example, a virtual image can be made to "follow" the object 410, as perceived by a user viewing the display 20. This "following" of the object using the virtual image may be maintained even when the relative positions of the camera and object 410 are changed (e.g. when one of or both of the camera and object move). CPU 140 can continually monitor a video stream for the keypoints 440, and repeat steps S22-25 in order to maintain tracking of an object 410.

Figure 7A:
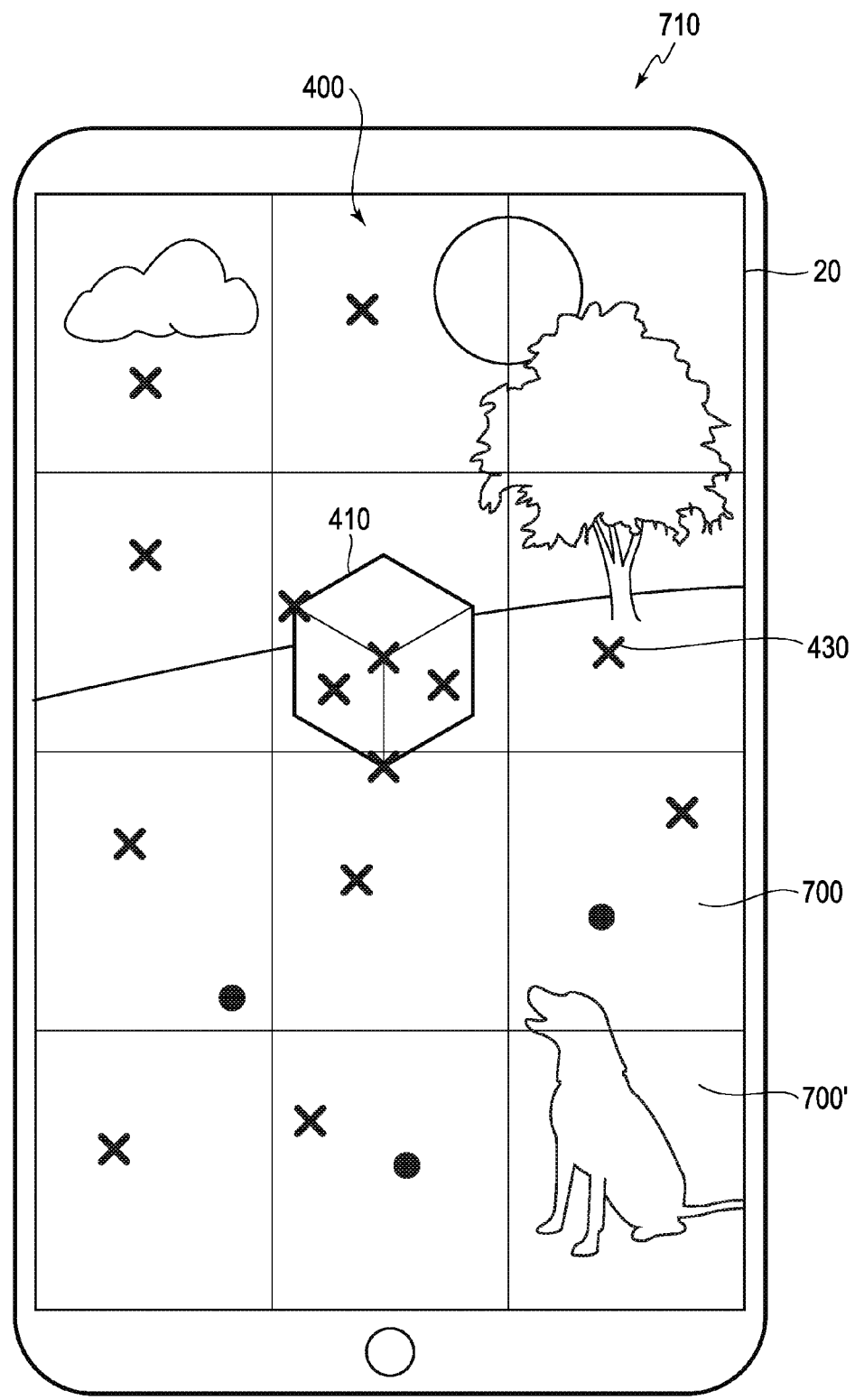
FIG. 7A is a diagram of a mobile device implementing a method of obtaining keypoints according to one embodiment.
Figure 7B:
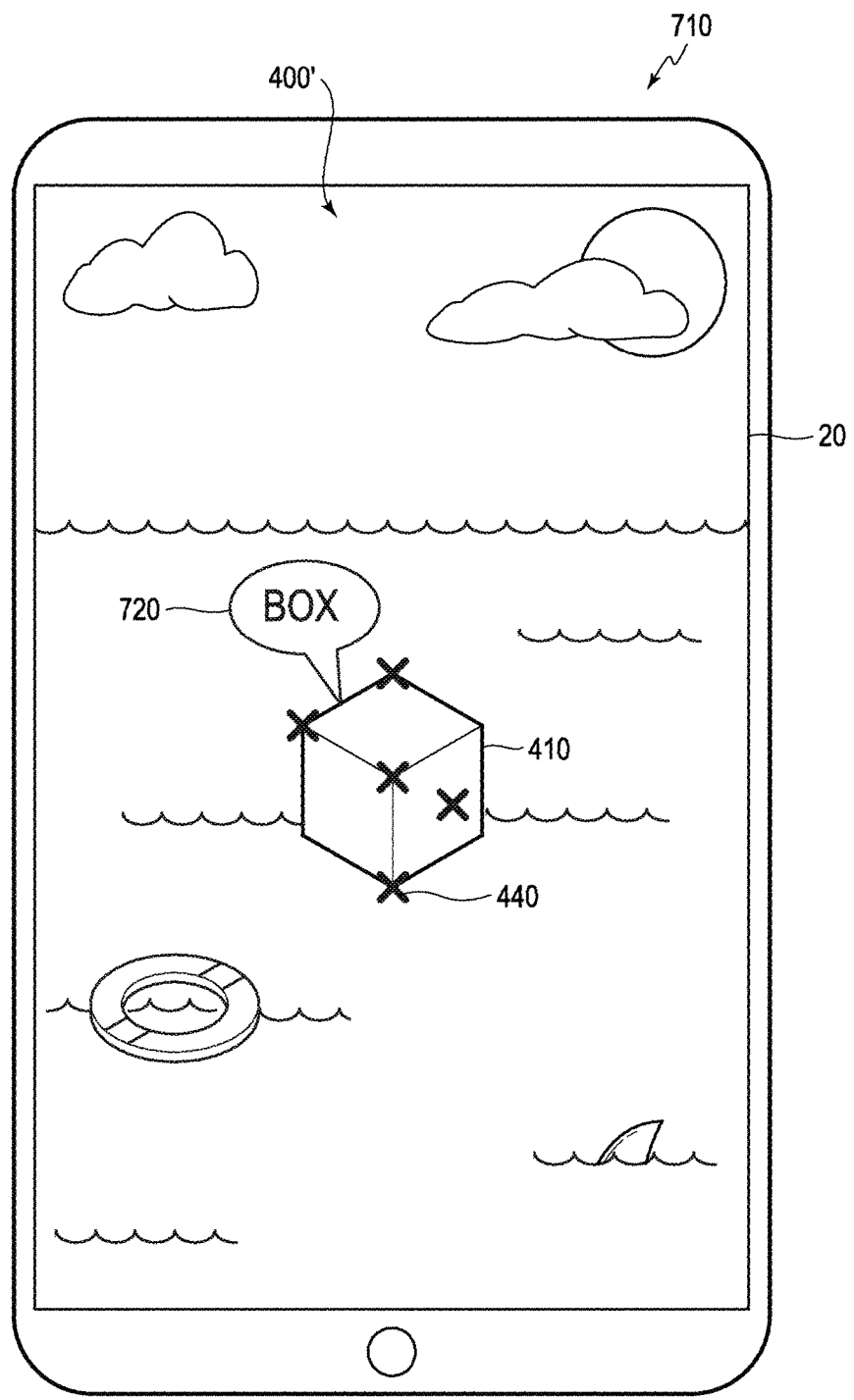
FIG. 7B is a diagram of a mobile device implementing a method of object detection and tracking according to one embodiment.

FIGS. 7A and 7B show mobile device implementations of embodiments of the methods of obtaining keypoints and of object recognition and tracking, respectively. In FIG. 7A, a first image is being obtained, and in FIG. 7B, a second image is being obtained, both the images are obtained using a mobile device 710 (e.g. a tablet or smartphone), equipped with a camera 60 (not explicitly shown in FIG. 7A).

Starting first with FIG. 7A, keypoint candidates 430 are being obtained in the first image. On the display 20 of mobile device 710, a scene 400 containing an object 410 (a box in this embodiment) that is being imaged by camera 60 is displayed. The CPU 140 (not explicitly shown in FIG. 7A) in the mobile device 710 divides the scene into a plurality cells 700, 700', and obtains the keypoint candidates 430 from the scene. As discussed previously, keypoint candidates 430 have distinctive features, such as high contrast or other features, and are automatically determined by CPU 140. In this embodiment, some of the plurality of cells contain the keypoint candidates 430, such as cell 700, and some do not, such as cell 700'. Cells 700 with keypoint candidates 430 are treated differently in certain embodiments of the method of selecting keypoints than cells 700' without keypoint candidates 430, as discussed previously. As shown in FIG. 7A, the cells 700 may likely have different numbers of keypoint candidates 430.

Once the keypoint candidates 430 are selected using a method disclosed herein, they are stored as the keypoints 440, similar to that discussed above in FIGS. 5A-5B.

As mentioned above, FIG. 7B shows the mobile device 710 (having a CPU 140 located therein) imaging the second image using the keypoints 430 identified in the first image of FIG. 7A. The mobile device 710 recognizes keypoints 440 that are determined based on the keypoints from the first image of FIG. 7A and that are located on the object 410. The mobile device 719 may then uses the keypoints 440 to locate and track the object 410.

It is noted that the object 410 in FIG. 7B is located in a different scene 400' than the scene 400 of FIG. 7A that was used for obtaining keypoints. In this embodiment, mobile device 710 is using the object tracking location information to add an information bubble 720 that follows object 410. This information bubble 720 is a virtual image on display 20 that is positioned at a location corresponding to the location information obtained from the object tracking. The implementations shown in FIGS. 7A and 7B can also be similarly implemented on an HMD 100, using the camera 60, display section 20, and CPU 140 located thereon.

In another embodiment, instead of a grid of cells 700, 700', e.g., a matrix of rectangular/square cells, the image frame may be divided into a tessellation of other polygon (triangles, hexagons or crosses, for example) since the same basic benefits the keypoint selection methods herein can be applied to grids having different cell shapes.

The system may be implemented in forms aspects other than the information processing device. For example, the system may be implemented in forms such as a head mounted display, a display device, a control method for the information processing device and the display device, an information processing system, a computer program for realizing functions of the information processing device, a recording medium (i.e. non-transient storage medium) recording the computer program thereon, a mobile device, a smartphone, a tablet, and data signals which include the computer program and are embodied in carrier waves.

The embodiments described herein result in technological improvement in the computer vision functions of the computer, HMD, mobile device, vehicle, or other device on which it is implemented. Specifically, object location and tracking accuracy is improved, even when a poorly or overly lit source image or tracking environment is used. Moreover, accuracy is improved in outdoor environments where lighting and contrast are higher than indoor environments. These improvements are realized without consuming significantly higher computer resources, and can therefore be implemented real-time using low power computing hardware.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present invention has been presented for purposes of illustration and description, but is not intended to be exhaustive or limited to embodiments of the invention in the form explicitly disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A head-mounted display, comprising:
    a camera that obtains an image of an object within a field of view;
    a processor configured to:
        (a) determine a plurality of feature points from the image and calculate a feature strength for each of the plurality of feature points;
        (b) divide the image into a plurality of cells and identify a number of cells containing non-selected feature points which are feature points that have not yet been selected;
        (c) determine a number of feature points to be selected for each of the number of cells containing non-selected feature points, wherein the number of feature points to be selected is based on the number of cells containing the non-selected feature points;
        (d) select, up to the determined number of feature points to be selected, feature points having the highest feature strength from each cell and which have not yet been selected, thereby identifying the feature points as selected feature points instead of non-selected feature points;
        (e) repeat steps (c) through (d); and
        (f) detect and track the object within the field of view using the selected feature points;
    a display that allows simultaneous viewing of an external scene and a virtual image, and when the object is within the field of view, the display is configured to display a virtual image in a consistent positional relationship to the object using object location information derived from detecting or tracking the object.

2. The head-mounted display of claim 1, wherein the number of feature points to be selected is inversely proportional to the number of cells containing non-selected feature points.

3. The head-mounted display of claim 2, wherein the number of feature points to be selected is a quota divided by the number of cells containing non-selected feature points.

4. The head-mounted display of claim 1, wherein steps (c) through (d) are repeated until a number of selected feature points is equal to a quota.

5. The head-mounted display of claim 1, wherein the processor is further configured to:
    (g) compare the number of cells containing non-selected feature points to a quota, prior to step (e); and
    (h) repeat steps (c) through (d) in step (e) only when the quota is less than or equal to the number of cells containing non-selected feature points.

6. The head-mounted display of claim 5, wherein the processor is further configured to:
    (i) when the quota is greater the number of cells containing non-selected feature points, determine if a number of selected feature points is equal to the quota, prior to step (f); and
    (j) when the number of selected feature points is less than the quota:
        (j1) sort non-selected feature points by their feature strength; and
        (j2) select a number of non-selected feature points equal to a difference between the quota and the number of selected feature points.

7. The head-mounted display of claim 1, wherein in step (d), for each cell, a number of selected feature points is equal to the number of feature points to be selected when a total number of feature points in the cell is greater than or equal to the number of feature points to be selected, and the number of selected feature points is equal to the total number of feature points in the cell when the total number of feature points in the cell is less than the number of feature points to be selected.

8. The head-mounted display of claim 1, wherein step (f) includes:
    (f1) obtain a second image of the object in the external scene using the camera or another camera;
    (f2) locate selected feature points within the image; and
    (f3) generate location information of the object within the external scene based on locations of the selected feature points obtained in step (f2).

9. The head-mounted display of claim 1, wherein the number of feature points to be selected is selected based on an optimization equation.

10. A non-transitory storage medium containing program instructions that when executed by a processor, cause the processor to:
(a) obtain an image of an object;
(b) determine a plurality of feature points from the image and calculate a feature strength for each of the plurality of feature points;
(c) divide the image into a plurality of cells and identify a number of cells that contain non-selected feature points which are feature points that have not yet been selected;
(d) determine a number of feature points to be selected for each of a number of cells containing non-selected feature points, wherein the number of feature points to be selected is based on the number of cells containing the non-selected feature points;
(e) select, up to the number of feature points to be selected, feature points having the highest feature strength from each cell and which have not yet been selected, thereby identifying the feature points as selected feature points instead of non-selected feature points;
(f) repeat steps (d) through (e); and
(g) detect the object within a scene using the selected feature points.

11. A method of detecting an object in a scene using a computer, the method comprising:
(a) obtaining an image of an object, using a camera;
(b) determining a plurality of feature points from the image and calculating a feature strength for each of the plurality of feature points, using a processor;
(c) dividing the image into a plurality of cells and identifying a number of cells that contain non-selected feature points which are feature points that have not yet been selected, using the processor;
(d) determining a number of feature points to be selected for each of a number of cells containing non-selected feature points, wherein the number of feature points to be selected is based on the number of cells containing the non-selected feature points, using the processor;
(e) selecting, up to the number of feature points to be selected, feature points having the highest feature strength from each cell and which have not yet been selected, thereby identifying the feature points as selected feature points instead of non-selected feature points, using the processor;
(f) repeating steps (d) through (e); and
(g) detecting the object within the scene using the selected feature points, using the processor.

12. The method of claim 11, wherein the number of feature points to be selected is inversely proportional to the number of cells containing non-selected feature points.

13. The method of claim 12, wherein the number of feature points to be selected is a quota divided by the number of cells containing non-selected feature points.

14. The method of claim 11, wherein steps (d) through (e) are repeated until a number of selected feature points is equal to a quota.

15. The method of claim 11, further comprising:
(h) comparing the number of cells containing non-selected feature points to a quota, using the processor, prior to step (f); and
(i) repeating steps (d) through (e) in step (f) only when the quota is less than or equal to the number of cells containing non-selected feature points.

16. The method of claim 15, further comprising:
(j) when the quota is greater the number of cells containing non-selected feature points, determining if a number of selected feature points is equal to the quota, using the processor, prior to step (g); and
(k) when the number of feature points in the selected groups is less than the quota:
(k1) sorting non-selected feature points by their feature strength, using the processor; and
(k2) selecting a number of non-selected feature points equal to a difference between the quota and the number of selected feature points, using the processor.

17. The method of claim 11, further comprising:
(h) tracking the object using the selected feature points, using the processor.

18. The method of claim 17, further comprising:
(i) displaying a virtual image in a consistent positional relationship to an image of the object using object location information derived from step (h).

19. The method of claim 11, wherein in step (e), for each cell, a number of selected feature points is equal to the number of feature points to be selected when a total number of feature points in the cell is greater than or equal to the number of feature points to be selected, and the number of selected feature points is equal to the number of feature points in the cell when the total number of feature points in the cell is less than the number of feature points to be selected.

20. The method of claim 11, wherein step (g) includes:
(g1) obtaining a second image of the object in the scene using the camera or another camera;
(g2) locating selected feature points within the image; and
(g3) generating location information of the object within the scene based on locations of the selected feature points obtained in step (g2).

* * * * *